United States Patent
Ge et al.

(10) Patent No.: US 10,554,584 B2
(45) Date of Patent: Feb. 4, 2020

(54) DEDICATED SSR PIPELINE STAGE OF ROUTER FOR EXPRESS TRAVERSAL (EXTRA) NOC

(71) Applicant: HUAWEI INTERNATIONAL PTE. LTD, Singapore (SG)

(72) Inventors: Zhiguo Ge, Singapore (SG); Naxin Zhang, Singapore (SG)

(73) Assignee: Huawei International Pte. Ltd., Singapore (SG)

( * ) Notice: Subject to any disclaimer, the term of this patent is extended or adjusted under 35 U.S.C. 154(b) by 0 days.

(21) Appl. No.: 16/032,804

(22) Filed: Jul. 11, 2018

(65) Prior Publication Data
US 2018/0324110 A1 Nov. 8, 2018

Related U.S. Application Data

(63) Continuation of application No. PCT/SG2017/050003, filed on Jan. 4, 2017.

(30) Foreign Application Priority Data

Jan. 12, 2016 (SG) .......................... 10201600224S (51) Int. Cl.
*H04L 12/933* (2013.01)
*H04L 12/433* (2006.01)
(Continued)

(52) U.S. Cl.
CPC ........ *H04L 49/1546* (2013.01); *H04L 12/433* (2013.01); *H04L 12/5601* (2013.01);
(Continued)

(58) Field of Classification Search
None
See application file for complete search history.

(56) References Cited

U.S. PATENT DOCUMENTS 8,509,078 B2 * 8/2013 Moscibroda ............ H04L 45/00
370/230
9,015,448 B2 * 4/2015 Krishna ............ G06F 15/17337
712/16
(Continued)

FOREIGN PATENT DOCUMENTS

EP 0823168 A1 2/1998
WO 9731462 A1 8/1997

OTHER PUBLICATIONS

Tushar Krishna et al, "Breaking the On-Chip Latency Barrier Using SMART," in High-Performance Computer Architecture (HPCA) (2013).

*Primary Examiner* — Phirin Sam
(74) *Attorney, Agent, or Firm* — Leydig, Voit & Mayer, Ltd.

(57) ABSTRACT

This invention is related to an Express Traversal (EXTRA) Network on Chip (NoC) comprising a number of EXTRA routers. The EXTRA NoC comprises a Buffer Write and Route Computation (BW/RC) pipeline, a Switch Allocation-Local (SA-L) pipeline, a Setup Request (SR) pipeline, a Switch Allocation-Global (SA-G) pipeline, and a Switch Traversal and Link Traversal (ST/LT) pipeline. The BW/RC pipeline is configured to write an incoming flit to an input buffer(s) of a start EXTRA router and compute the route for the incoming head flit by selecting an output port to depart from the start EXTRA router. The SA-L pipeline is configured to arbitrate the start EXTRA router to choose an input port and an output port for a winning flit. The SR pipeline is configured to handle the transmission of a number of SR signals from the start EXTRA router to downstream EXTRA routers.

10 Claims, 8 Drawing Sheets

(51) Int. Cl.
  *H04L 12/54*    (2013.01)
  *H04L 12/861*   (2013.01)
  *H04L 12/70*    (2013.01)
(52) U.S. Cl.
  CPC ...... *H04L 49/1576* (2013.01); *H04L 49/9005* (2013.01); *H04L 2012/5674* (2013.01)

(56) References Cited

U.S. PATENT DOCUMENTS

| | | | |
|---|---|---|---|
| 2008/0225716 A1* | 9/2008 | Lange | H04L 41/0896 370/232 |
| 2009/0055603 A1* | 2/2009 | Holt | G06F 8/456 711/154 |
| 2009/0089478 A1 | 4/2009 | Singh et al. | |
| 2013/0051397 A1* | 2/2013 | Guo | H04L 45/00 370/400 |
| 2013/0142066 A1* | 6/2013 | Yamaguchi | H04L 49/109 370/252 |
| 2014/0254588 A1 | 9/2014 | Park et al. | |
| 2015/0046657 A1* | 2/2015 | Guthmuller | G06F 12/0846 711/129 |
| 2015/0281391 A1* | 10/2015 | Hughes | G06F 12/0862 709/219 |
| 2016/0164794 A1* | 6/2016 | Ramalingam | H04L 47/365 370/235 |
| 2017/0155738 A1* | 6/2017 | Dong | H04L 67/1097 |
| 2017/0257318 A1* | 9/2017 | Haleem | H04W 4/70 |

* cited by examiner

DEDICATED SSR PIPELINE STAGE OF ROUTER FOR EXPRESS TRAVERSAL (EXTRA) NOC

CROSS-REFERENCE TO RELATED APPLICATIONS

This application is a continuation of International Application No. PCT/SG2017/050003, filed on Jan. 4, 2017, which claims priority to Singaporean Patent Application No. SG10201600224S, filed on Jan. 12, 2016, The disclosures of the aforementioned applications are hereby incorporated by reference in their entireties.

FIELD OF INVENTION

This invention relates to an Express Traversal (EXTRA) Network on Chip (NoC). Particularly, embodiments of this invention relate to separating one of the pipeline stages in the Single-cycle Multiple-hop Asynchronous Repeated Traversal (SMART) NoC to improve the clock frequency of a SMART router. The optimized NoC is called EXTRA NoC.

SUMMARY OF THE PRIOR ART

The number of on-chip cores in a computer system has been increasing significantly during the last decade. The scalability and performance of the multi-core designs heavily depends on the interconnection sub-system (e.g., network on chip) connecting the cores.

The latency of the packages travel through Network-on-chip (NoC) is critical for the performance of NoC and systems. Multiple methods have been proposed to reduce the latency.

One known method is Single-cycle Multiple-hop Asynchronous Repeated Traversal (SMART) [T Krishna et al., "Breaking the On-Ship Latency Barrier Using SMART", in High-Performance Computer Architecture (HPCA) 2013]. The aim of SMART is to present a single-cycle data-path all the way from the source to the destination. In order to support SMART, the router architecture and flow control need to be re-designed.

Figure 1:
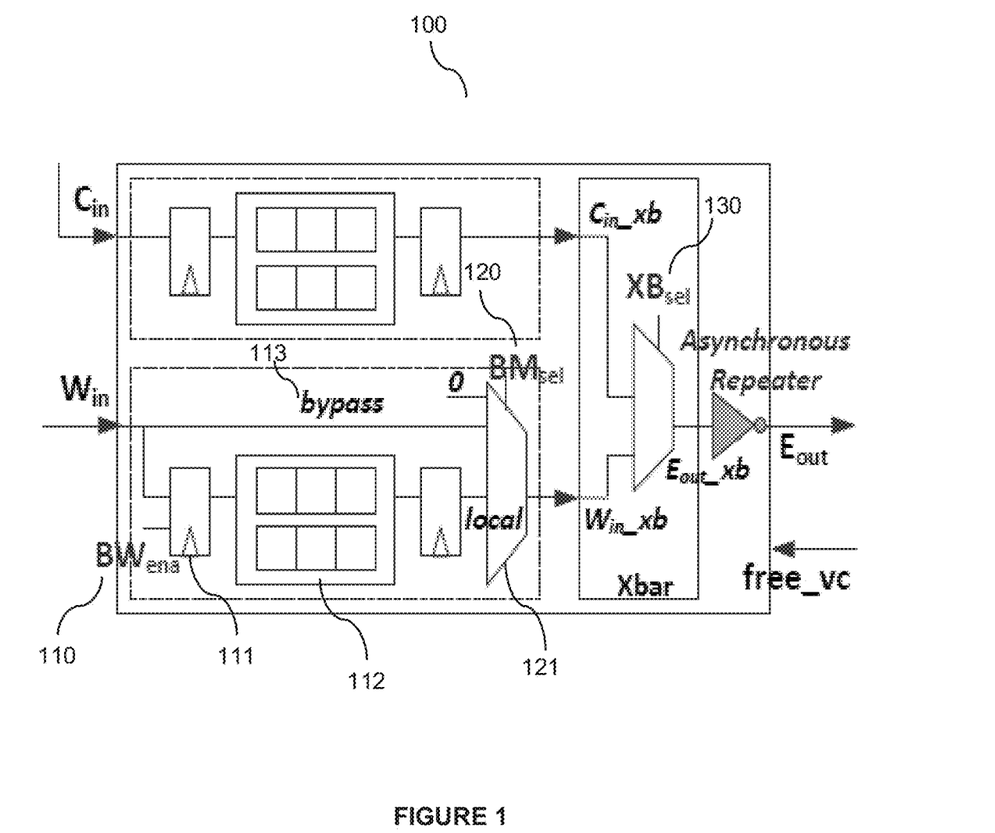
FIG. 1 illustrates a SMART router microarchitecture.

FIG. 1 shows the SMART router micro-architecture 100. For brevity, only $Core_{in}$ ($C_{in}$), $West_{in}$ ($W_{in}$) and $East_{out}$ ($E_{out}$) ports are shown. All other input ports are identical to $W_{in}$, and all other output ports are identical to $E_{out}$. The following three major control signals are added:

1. Buffer write enable ($BW_{ena}$) 110 at the input flip flop 111 determines if the input flit is written to input buffer 112 or not;
2. Bypass Mux ($BM_{sel}$) 120 selects signal at the input of the crossbar 121 to choose between the local buffered flit 112 and the bypassing flit 113 on the link; and
3. Crossbar select signal ($XB_{sel}$) 130 connects selected input line to the output line.

$E_{out}\_xb$ can be connected either to $C_{in}\_xb$ or $W_{in}\_xb$. $W_{in}\_xb$ can be driven by either bypass or local depending on $BM_{sel}$. Through these three major control signals, the router has two modes: normal mode and bypass mode. The normal mode behaves the same as standard routers, while the bypass mode can bypass the incoming flit directly to the downstream router.

Figure 2:
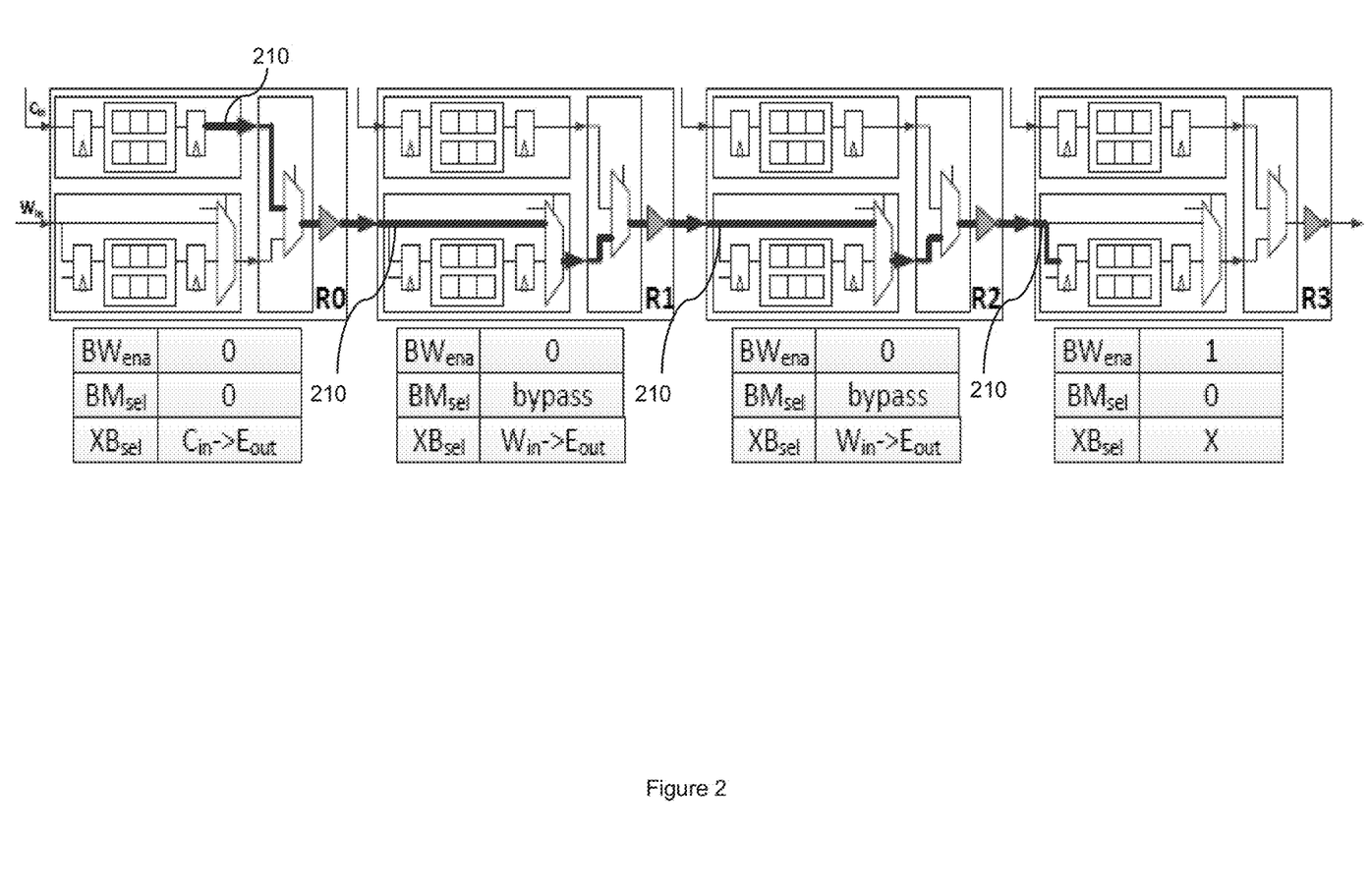
FIG. 2 illustrates an example of a flit traversing through a SMART NoC.

The SMART NoC consists of SMART routers for sending messages in packets (or a portion of packets known as "flits") where the flits can traverse multi-hops within one cycle by setting the three major control signals accordingly. FIG. 2 shows an example of a SMART NoC. In this example, assuming a flit needs to be transferred from R0 to R3, the intermediate routers R1 and R2 are set as bypass mode with the crossbar set to connect $W_{in}$ to $E_{out}$ so that the flit from Router R0 traverses 3-hops within a cycle to reach R3, as illustrated by the line 210.

There are four pipeline stages of SMART router:
1. BW/RC: Buffer Write for incoming flit and Route Computation for incoming head flit to choose an output port to depart from,
2. SA-L: Local switch allocation (i.e. switch allocation for local messages),
3. SA-G: Global switch allocation (i.e. switch allocation between SSR requests and local messages),
4. ST/LT: Switch Traversal and Link Traversal.

For purposes of this disclosure, messages are transmitted in multiple packets and these packets are further divided into smaller pieces call flits.

In the first pipeline stage, the SMART router writes the incoming head flit to an input buffer or buffers and compute the destination of the incoming head flit by selecting an output port for the incoming head flit to depart from the SMART router. The output port is selected based on the destination information in the incoming head flit.

In a baseline router, the second pipeline stage involves Switch Allocation (SA) which is to determine the winning incoming port and output port of the crossbar. However, in the SMART router, the SA pipeline stage occurs over two pipeline stages, namely, Switch Allocation-Local (SA-L) pipeline stage and Switch Allocation-Global (SA-G) pipeline stage. The SA-L pipeline stage is identical to the SA pipeline stage in the conventional baseline router where every start router chooses a winning flit from among its buffered (local) flits for each output port. In the SA-G pipeline stage, instead of the winning flits directly traversing the crossbar, they broadcast a SMART-hop setup request (SSR) via dedicated repeated wire (SSR wires).

In the fourth pipeline stage, the winning flit traverses the crossbar switch which routes the winning flit to the appropriate output port. The winning flit then traverses to the destination node. The destination node may store the flit in the input buffer.

Essentially, in a SMART router, to build express SMART links across multi-hops, all the routers need to be synchronized in order to collaborate to work together. This synchronization is achieved through SMART-hop setup request (SSR) and the SSR wires that propagate the SSRs. With the SSR signals as inputs, each router has an arbitration component (SA-G) to arbitrate between the global SSRs and the local flit transfer requests to configure the router in a suitable mode, either in bypass mode or normal mode. This arbitration process is called global arbitration.

Figure 3:
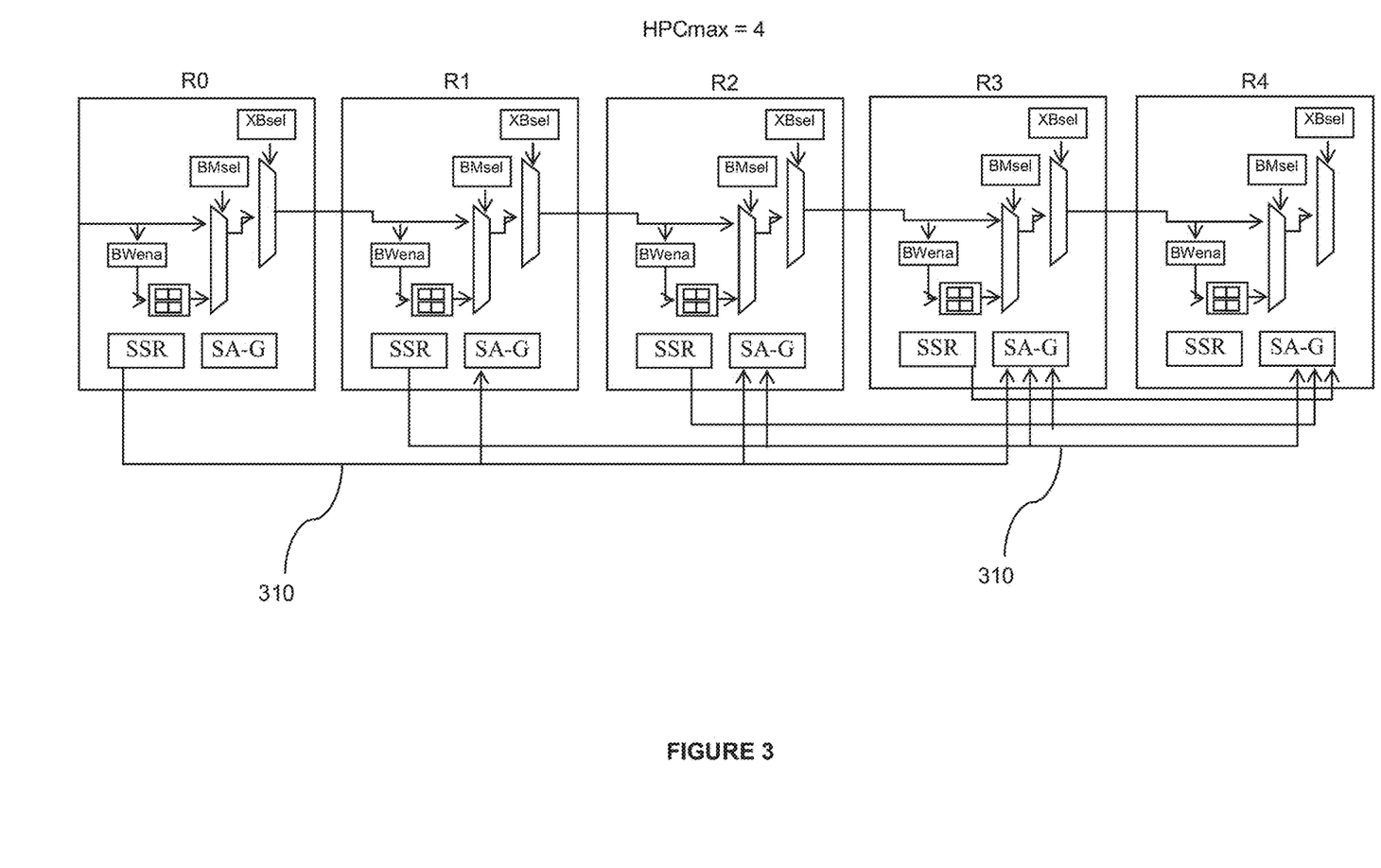
FIG. 3 illustrates the SSR wires connecting the SSR to each of the downstream SA-G.

The global arbitration determines the value of the three signals in each of the routers, namely, $BW_{ena}$, $BM_{sel}$, and $XB_{sel}$, to build an express path for a flit to traverse multiple hops within one cycle. In order to perform this global arbitration, the SMART router needs SSR signals that are from the upstream routers in the path of flit delivery. FIG. 3 shows an example of SMART NoC architecture with HPC-max=4, where HPC stands for Hops Per Cycle. The upstream SSR is connected to downstream SA-G via SSR wires 310. Accordingly, the SSR of R0 is communicatively connected to SA-Gs of R1-R4, SSR of R1 is communicatively connected to SA-Gs of R2-R4, SSR of R2 is communicatively connected to SA-Gs of R3-R4, and SSR of R3 is communicatively connected to SA-G of R4.

In the SMART design, the SSR traversal and SA-G are in the same pipeline stage. As both SSR traversal and SA-G require certain amount of time to complete their tasks, this pipeline stage become the critical path and severely limits the clock frequency of the router. Hence, those skilled in the art are constantly striving to come up with an improvement to increase the clock frequency of the router.

SUMMARY OF THE INVENTION

The above and other problems are solved and an advance in the art is made by an EXTRA router in accordance with this disclosure. An advantage of the EXTRA router is that the EXTRA router separates one of the pipeline stages in a SMART router into two pipeline stages. Particularly, the EXTRA router separates the SA-G pipeline stage into a first and second pipeline stages. This allows the EXTRA router to use a higher clock frequency and in turn reduces latency when compared to the original SMART router. More particularly, the idle time for BW/RC, SA-L and ST/LT pipeline stages is reduced since a higher clock frequency is used when compared to the original SMART router configuration.

In accordance with an aspect of the disclosure, an Express Traversal (EXTRA) Network on Chip (NoC) comprising a number of EXTRA routers is provided. The EXTRA NoC comprises a Buffer Write and Route Computation (BW/RC) pipeline, a Switch Allocation-Local (SA-L) pipeline, a Setup Request (SR) pipeline, a Switch Allocation-Global (SA-G) pipeline, and a Switch Traversal and Link Traversal (ST/LT) pipeline. These pipelines are configured as follows:

1. BW/RC pipeline is configured to write an incoming flit to an input buffer(s) of a start EXTRA router and compute a route for the incoming head flit by selecting an output port to depart from the start EXTRA router;

2. SA-L pipeline is configured to arbitrate the start EXTRA router to choose an input port and an output port for a winning flit;

3. SR pipeline is configured to handle transmission of SR signals from the start EXTRA router to downstream EXTRA routers;

4. SA-G pipeline is configured to arbitrate a Buffer write enable ($B_{ena}$), a Bypass Mux ($BM_{sel}$), and a Crossbar select signal ($XB_{sel}$) based on the SR signals received from the start EXTRA router to build an express path for the winning flit; and 5. ST/LT pipeline is configured to traverse the winning flit to the selected output port of the start EXTRA router and transmit the winning flit to a destination EXTRA router bypassing at least one EXTRA router between the start EXTRA router and destination EXTRA router.

In accordance with another aspect of this disclosure, a method of traversing flits in an EXTRA NoC comprising a number of EXTRA routers is provided. The method performs steps in stages according to the above pipelines. Particularly, in the BW/RC pipeline, the method writes an incoming flit to an input buffer(s) of a start EXTRA router and computes a route for the incoming head flit by selecting an output port to depart from the start EXTRA router. In the SA-L pipeline, the method arbitrates the start EXTRA router to choose an input port and an output port for a winning flit. In the SR pipeline, the method handles the transmission of the SR signals from the start EXTRA router to downstream EXTRA routers. In the SA-G pipeline, the method arbitrates a Buffer write enable ($BW_{ena}$), a Bypass Mux ($BM_{sel}$), and a Crossbar select signal ($XB_{sel}$) based on the SR signals received from the start EXTRA router to build an express path for the winning flit. In the ST/LT pipeline, the method traverses the winning flit to the selected output port of the start EXTRA router and transmits the winning flit to a destination EXTRA router and bypasses at least one EXTRA router between the start EXTRA router and destination EXTRA router.

In accordance with an embodiment of this disclosure, the SR signals are generated by the SA-L pipeline. Alternatively, the SR signals are generated by the SR pipeline. Further, registers are inserted between any two adjacent pipelines of the BW/RC, SA-L, SSR, SA-G, and ST/LT pipelines to regulate the time period of the pipelines. These registers are synchronously clocked.

BRIEF DESCRIPTION OF THE DRAWINGS

The above advantages and features in accordance with this disclosure are described in the following detailed description and are shown in the following drawings.

DETAILED DESCRIPTION

This disclosure relates to an EXTRA NoC. Particularly, this disclosure relates to separating one of the pipeline stages in the SMART NoC to improve the clock frequency of an EXTRA router.

The details of a SMART router can be found in the following reference, T Krishna et al., "Breaking the On-Ship Latency Barrier Using SMART", in High-Performance Computer Architecture (HPCA) 2013. As this disclosure is a modification of the SMART router, certain details of the SMART router are omitted for brevity.

To enable higher clock frequency, it is proposed that the SA-G pipeline stage is separated into two pipeline stages. Through this method, the clock frequency of the EXTRA routers can be increased. As a result, the latency that the flits and packets traverse through the EXTRA NoC can be greatly reduced. Further details will now be described.

Figure 4:
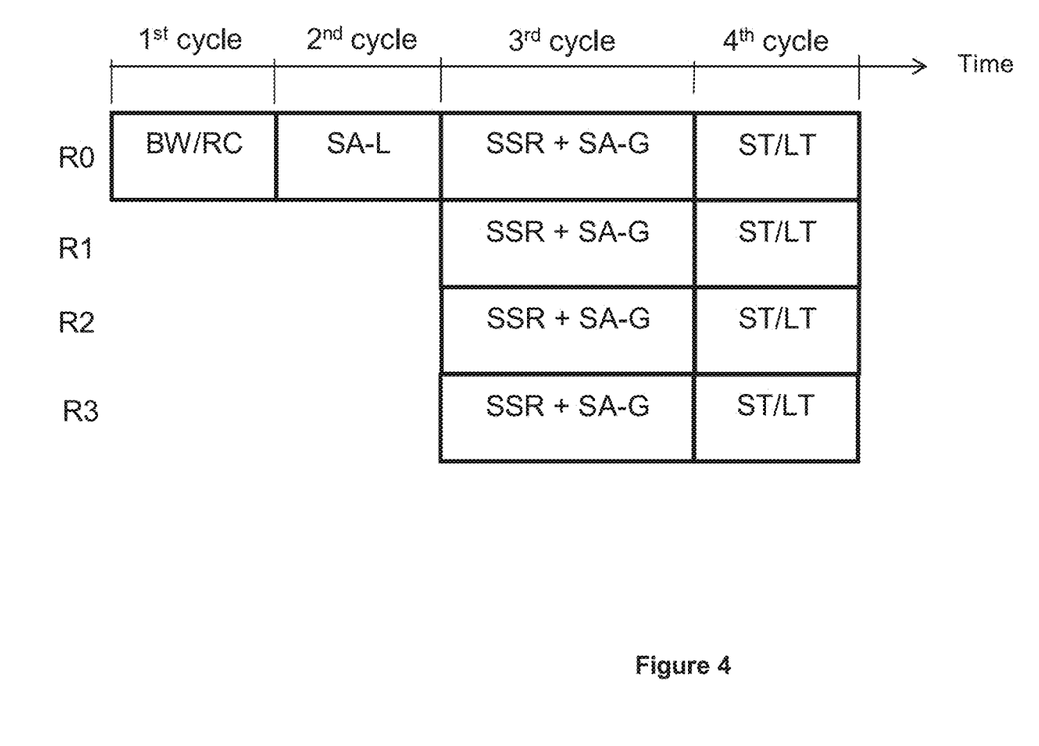
FIG. 4 illustrates a timing diagram of a SMART router pipeline.
Figure 5:
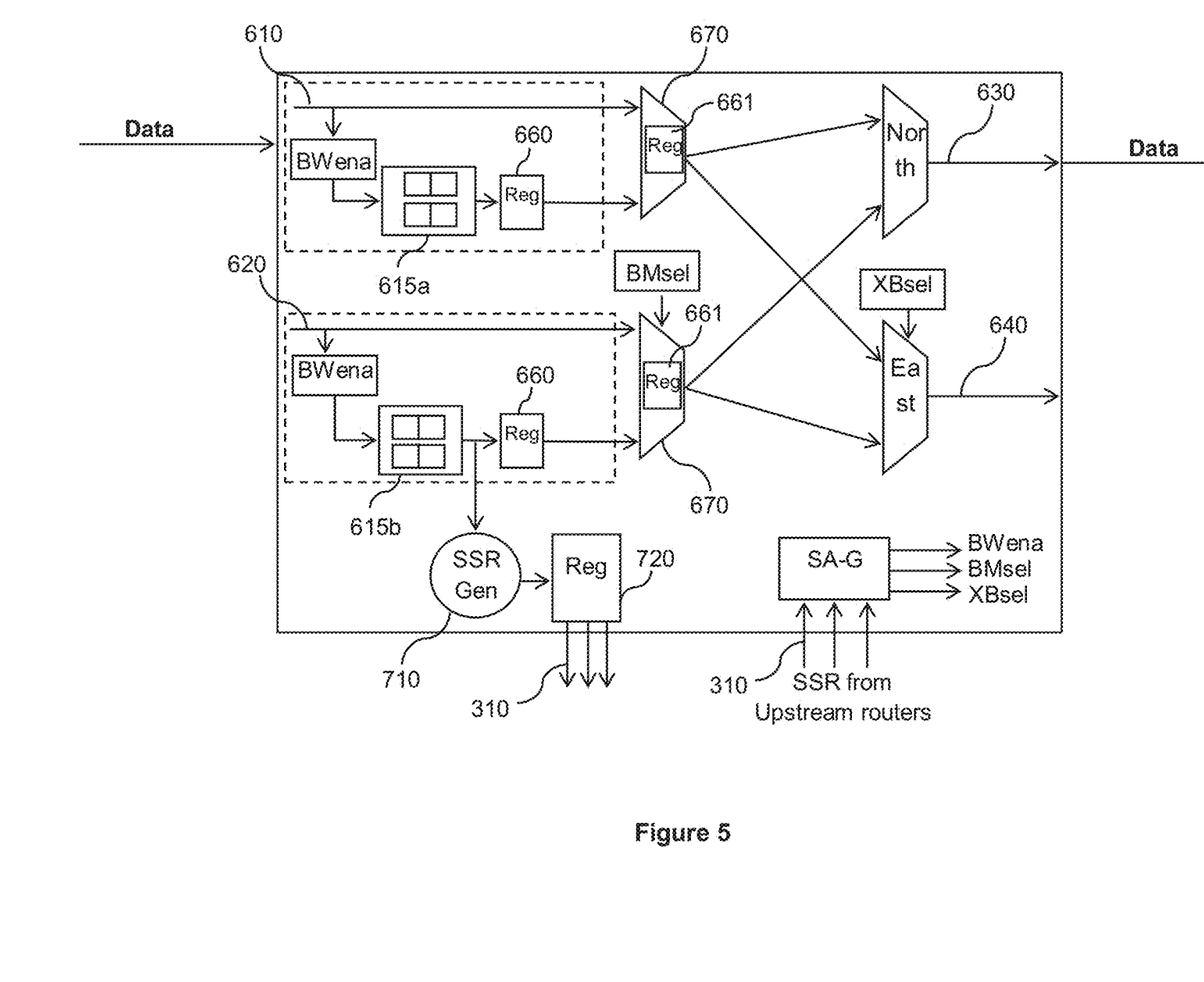
FIG. 5 illustrates a router architecture of the SMART router.

FIG. 4 illustrates a timing diagram of a SMART router pipeline of the example shown in FIG. 2. FIG. 5 illustrates a router architecture of the SMART router. For simplicity, only two input ports, namely Core$_{in}$ 610 and West$_{in}$ 620 and two output ports North$_{out}$ 630 and East$_{out}$ 640 are shown.

As mentioned above, there are four pipeline stages for a SMART router. In the example as shown in FIG. 4, a winning flit in router R0 needs to traverse to router R3. In other words, the winning flit from among its buffered (local) flits 615a or 615b in router R0 wishes to hop thrice to reach router R3. Hence, during the third pipeline stage, SSR signals, to indicate a 3-hop path request, are generated and transmitted to downstream routers R1-R3 so that during the SA-G pipeline stage, respective BWena, BMsel, and XBsel signals are set accordingly to build an express path for the winning flit of R0 to traverse multiple hops within one cycle to router R3.

The example as shown in FIG. 4 proceeds with the first pipeline stage (i.e. BW/RC pipeline) of writing an incoming head flit to an input buffer(s) and computing the destination of the incoming head flit by choosing an output port to depart from the start router, based on the destination information in the incoming head flit. In this instance, the start router is the router R0. In the second pipeline stage (i.e. SA-L pipeline), router R0 arbitrates locally to choose input/output port winners. Particularly, router R0 chooses a winning flit from among its buffered (local) flits for each output port. In this instance, assuming the winning flit is selected from among the buffered (local) flits of 615a, router R0 arbitrates locally to select $C_{in}$ 610 as input port and $E_{out}$ as output port.

In the third pipeline stage (i.e. SA-G pipeline), the routers R0-R3 arbitrate among the SSR signals they received to set the $BW_{ena}$, $BM_{sel}$, and $XB_{sel}$ signals accordingly to build an express path for a winning flit in router R0 to traverse multiple hops within one cycle to router R3. Hence, R0 begins the third pipeline stage (i.e. SA-G pipeline) in the third cycle by generating SSR signals, via the SSR generator 710. It then transmits SSR signals, via the register 720, to the downstream routers R1, R2 and R3. In response to receiving the SSR signals from R0, the SA-G of R1 sets $BM_{sel}$ as bypass and $XB_{sel}$ as $W_{in}$ to $E_{out}$, the SA-G of R2 sets $BM_{sel}$ as bypass and $XB_{sel}$ as $W_{in}$ to $E_{out}$, and the SA-G of R3 sets $BW_{ena}$ as 1 to receive input and $BM_{sel}$ to 0 to stop bypass. During the third pipeline stage, instead of the winning flit traversing to the crossbar 670, the winning flit is being delayed by one cycle via the register 660.

In the fourth cycle, routers R0-R3 proceed to the fourth pipeline stage (i.e. ST/LT pipeline) where the winning flit traverses the crossbar switch to the selected output port in router R0 and is subsequently transmitted to router R3 bypassing routers R1 and R2.

As illustrated by the example in FIG. 4, during the third pipeline stage, appropriate SSR signals are generated and transmitted to downstream routers in order for respective SA-G to arbitrate the routers in a suitable mode, either in bypass mode or normal mode. Since SA-G takes place after receiving the SSR from the upstream routers, SSR and SA-G occur serially during the third pipeline stage. Thus, the time required is typically longer than the other 3 pipeline stages. Each pipeline stage takes certain amount of time to complete. However, in order to ensure one clock frequency can be used, the clock frequency has to be derived based on the pipeline that requires the longest amount of time. In this instance, the clock frequency is based on the third pipeline stage. For example, assuming the first pipeline stage (i.e. BW/RC pipeline) takes 0.8 ns, second pipeline stage (i.e. SA-L pipeline) takes 0.9 ns, third pipeline stage (i.e. SSR and SA-G pipeline) takes 2 ns, fourth pipeline stage (i.e. ST/LT pipeline) takes 0.9 ns, the minimum clock frequency has to be based on the third pipeline stage which equates to 0.5 GHz (i.e. inverse of 2 ns).

Similar to the SMART NoC, the EXTRA NoC consists of a number of EXTRA routers for sending messages in packets (or a portion of packets known as "flits") where the flits can traverse multi-hops within one cycle by setting the three major control signals accordingly. In accordance with an embodiment of this disclosure, the EXTRA router consists of five pipeline stages: 1) BW/RC pipeline, 2) SA-L pipeline, 3) Setup Request (SR) pipeline, 4) SA-G pipeline, and 5) ST/LT pipeline. In the EXTRA router, SR and SA-G are separated into two pipeline stages. Hence, SR and SA-G can be performed serially under two separate pipeline stages. This increases the clock frequency and reduces the latency that the flits traverse through the EXTRA NoC as will be shown in FIGS. 6 and 7 below.

Figure 6:
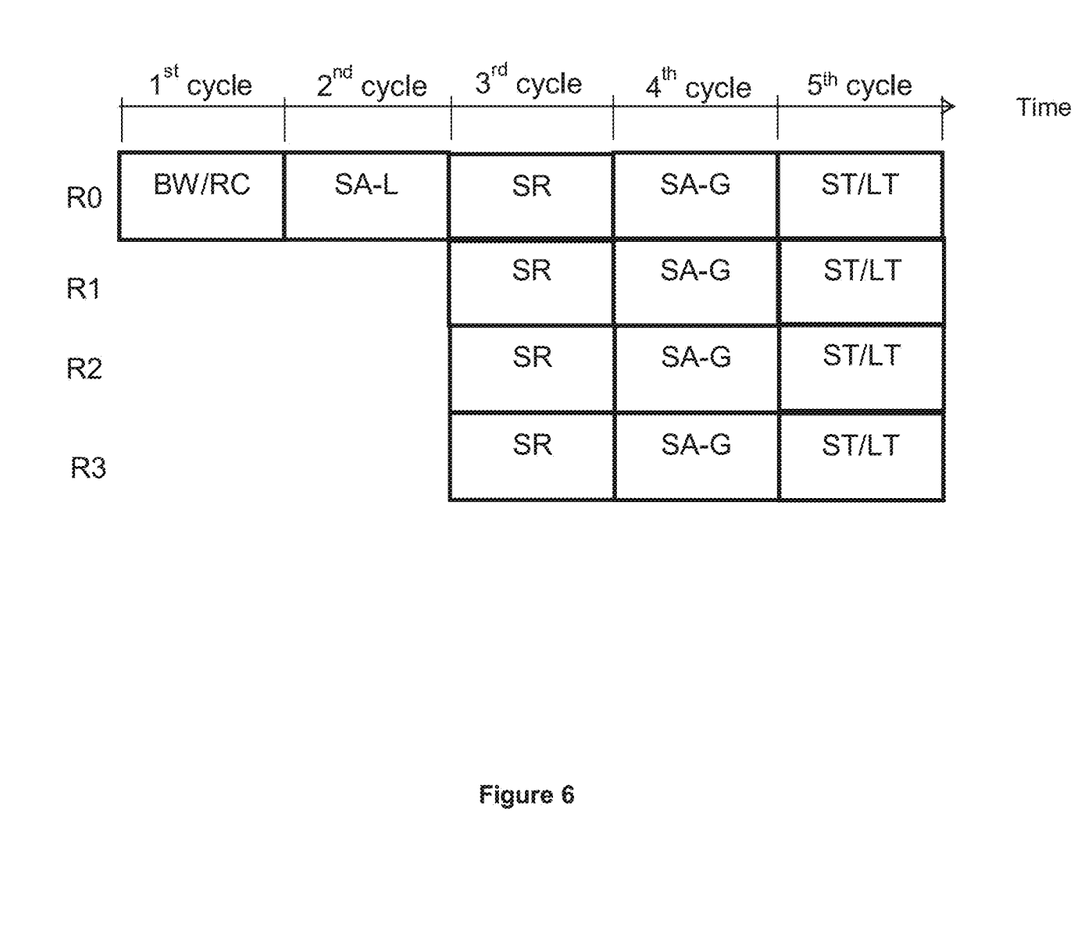
FIG. 6 illustrates a timing diagram of an EXTRA router pipeline in accordance with an embodiment of this disclosure.

FIG. 6 illustrates a timing diagram of the EXTRA router pipeline stages with 4 routers, namely, R0, R1, R2 and R3. Similar to the example as shown in FIG. 4, FIG. 6 also illustrates an example of a winning flit in R0 wishes to hop thrice to R3.

The first, second and fifth pipeline stages processed in FIG. 6 are similar to first, second and fourth pipeline stages in FIG. 4. The main difference between FIGS. 4 and 6 is that the third pipeline stage in FIG. 4 is being separated into two pipeline stages. In the EXTRA router pipeline stages, 5 cycles are required to complete the 5 pipeline stages for the example shown in FIG. 6.

Figure 7:
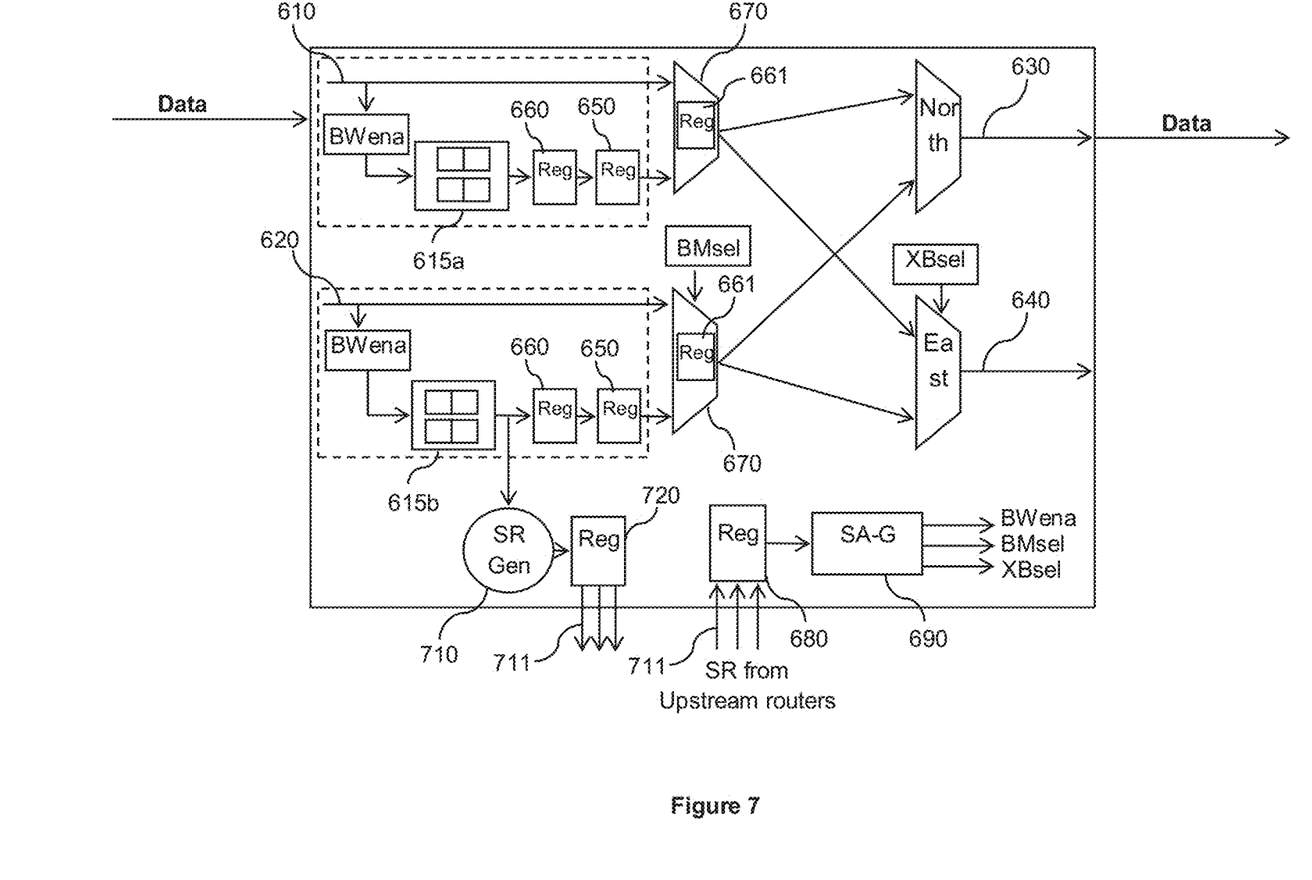
FIG. 7 illustrates a router architecture of the EXTRA router in accordance with an embodiment of this disclosure.

For brevity, only the third and fourth pipeline stages would be discussed since the first, second and fifth pipeline stages remain the same. In the third pipeline stage (i.e. SR pipeline), SR signal is generated for the winning flit determined in the SA-L pipeline stage. The SR signals are then transmitted to downstream routers (i.e. R0 transmitted to R1-R3) via the SR wires 711. Similar to SSR wires 310, SR wires are dedicated repeated wires to connect the EXTRA routers so that upstream SR is communicatively connected to the SA-G of downstream EXTRA routers. During the third pipeline stage, the SA-L winning flit is being delayed by one cycle via the register 660.

The time required to transmit the SR signal to downstream routers depends on the length of the SR wires 711. Thus, the time taken to transmit SR signals to downstream routers would increase as HPC increases since longer SR wires 711 are required to connect the upstream router to the downstream routers. Hence, alternatively, in order to shorten the time period for the third pipeline stage, the SR signals may be generated in the second pipeline stage (i.e. SA-L pipeline). Essentially, the SR pipeline is for handling the transmission of the SR signals from the start router, R0, to downstream routers, R1-R3. In other words, the SR signals may be generated either in the SA-L pipeline or the SR pipeline.

In the fourth pipeline stage (i.e. SA-G pipeline), the SA-G receives SR signals from upstream router R0 and proceeds to arbitrate $BW_{ena}$, $BM_{sel}$, and $XB_{sel}$ accordingly. In this instance, R1 sets $BM_{sel}$ as bypass and $XB_{sel}$ as $W_{in}$ to $E_{out}$, R2 sets $BM_{sel}$ as bypass and $XB_{sel}$ as $W_{in}$ to $E_{out}$, and R3 sets $BW_{ena}$ as 1 to receive input and $BM_{sel}$ to 0 to stop bypass. During the fourth stage, the winning flit determined in the SA-L pipeline stage is being delayed by another cycle via the register 650.

FIG. 7 illustrates a router architecture of the EXTRA router in accordance with this disclosure. For simplicity, only two input ports, namely $Core_{in}$ 610 and $West_{in}$ 620 and two output ports $North_{out}$ 630 and $East_{out}$ 640 are shown.

In order to separate the SSR/SA-G pipeline in the original SMART architecture into two pipeline stages, i.e. SR pipeline and SA-G pipeline, an additional register 650 is added before the input of crossbar switch 670. Particularly, additional register 650 is provided between the register 660 at the output of the SA-L pipeline and the register 661 at the input of the ST/LT pipeline. The additional register 650 is required to delay the winning flit from the start router from traversing to the crossbar switch 670 by one cycle. In other words, the two registers 650 and 660 are required to delay the winning flit by two cycles since the original third pipeline stage is being separated into third and fourth pipeline stages.

Registers are inserted in between pipeline stages and are clocked synchronously. Hence, register 680 is added before the input of SA-G to separate SA-G pipeline from SR pipeline. One skilled in the art will recognise that FIGS. 5 and 7 are meant for the purposes of illustrating the separation of the SA-G pipeline into two pipelines. Hence, only the relevant registers to illustrate the separation of the SA-G pipeline are produced in FIGS. 5 and 7.

Figure 8:
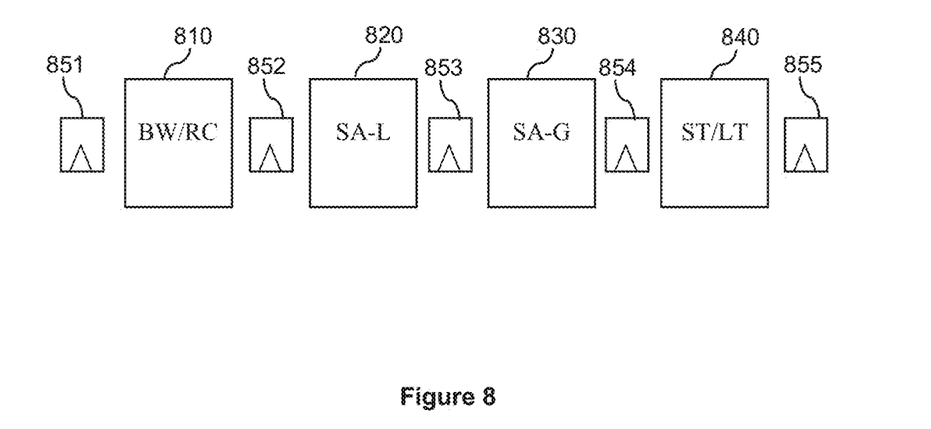
FIG. 8 illustrates a representative block diagram of the arrangement of the pipeline stages and registers of a SMART router.
Figure 9:
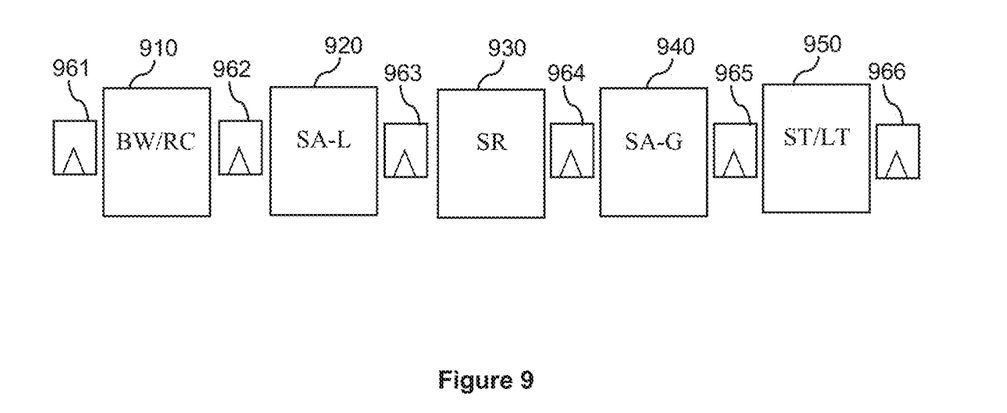
FIG. 9 illustrates a representative block diagram of the arrangement of the pipeline stages and registers of the EXTRA router in accordance with an embodiment of this disclosure.

FIGS. 8 and 9 are representative block diagrams to illustrate the arrangement of the registers and the pipeline stages of a SMART router and EXTRA router respectively. As shown in FIG. 8, the SMART router comprises of 4 pipeline stages 810-840 with registers 851-855 being inserted between each of the pipeline stages, namely, BW/RC pipeline, SA-L pipeline, SA-G pipeline and ST/LT pipeline. As shown in FIG. 9, the EXTRA router comprises of 5 pipeline stages 910-950 with registers 961-966 being inserted between each of the pipeline stages, namely, BW/RC pipeline, SA-L pipeline, SR pipeline, SA-G pipeline and ST/LT pipeline.

The time between each clock signal is set to be greater than the longest delay between pipeline stages, so that when the registers are clocked, the data that is written to them is the final result of the previous stage. Since the original third pipeline stage is being separated into two pipeline stages (i.e. third and fourth pipeline stages), the time required in the original third pipeline stage is also divided. For example, in this instance, assuming the first pipeline stage (i.e. BW/RC) takes 0.8 ns, second pipeline stage (i.e. SA-L) takes 0.9 ns, third pipeline stage (i.e. SR) takes 1 ns, fourth pipeline stage (SA-G) takes 0.9 ns, fifth pipeline stage (i.e. ST/LT) takes 0.9 ns, the clock frequency has to be based on the third pipeline stage which equates to 1 GHz (i.e. inverse of 1ns). Inevitably, this also reduces latency when compared to the original SMART router since a higher clock frequency is used. Particularly, the idle time for BW/RC, SA-L and ST/LT pipelines in the EXTRA router is reduced since a higher clock frequency is used when compared to the original SMART router configuration.

The above is a description of embodiments of an EXTRA NoC in accordance with the present disclosure. It is foreseeable that those skilled in the art can and will design alternative EXTRA NoC based on this disclosure that infringe upon this invention as set forth in the following claims.

What is claimed is:

1. An Express Traversal (EXTRA) Network on Chip (NoC) comprising a plurality of EXTRA routers, the EXTRA NoC comprising:
   a buffer write and route computation (BW/RC) pipeline configured to write an incoming flit to an input buffer of a start EXTRA router and compute a route for the incoming head flit by selecting an output port to depart from the start EXTRA router;
   a switch allocation-local (SA-L) pipeline configured to arbitrate the start EXTRA router to choose an input port and an output port for a winning flit;
   a setup request (SR) pipeline configured to handle transmission of a plurality of SR signals from the start EXTRA router to downstream EXTRA routers via SR wires;
   a switch allocation-global (SA-G) pipeline configured to:
   receive the SR signals from the start EXTRA router via the SR wires; and arbitrate, based on the SR signals received from the start EXTRA router, three signals including: a buffer write enable ($BW_{ena}$) signal for a local buffered flit, a bypass mux ($BM_{sel}$) signal for a first crossbar switch, and a crossbar select ($XB_{sel}$) signal for a second crossbar switch of a selected output port, to build an express path for the winning flit to traverse multiple hops to a destination EXTRA router within one cycle of the start EXTRA router; and a switch traversal and link traversal (ST/LT) pipeline configured to: traverse the winning flit to the selected output port of the start EXTRA router, and transmit the winning flit to the destination EXTRA router bypassing, via the express path, at least one EXTRA router between the start EXTRA router and destination EXTRA router.

2. The EXTRA NoC according to claim 1 wherein the plurality of SR signals are generated by the SA-L pipeline.

3. The EXTRA NoC according to claim 1 wherein the plurality of SR signals are generated by the SR pipeline.

4. The EXTRA NoC according to claim 1 further comprising a plurality of registers inserted between any two adjacent pipelines of the BW/RC, SA-L, SR, SA-G, and ST/LT pipelines.

5. The EXTRA NoC according to claim 4, wherein the plurality of registers are clocked synchronously.

6. A method of traversing flits in an Express Traversal (EXTRA) Network on Chip (NoC) having a plurality of EXTRA routers, the method comprising:
   (A) in a buffer write and route computation (BW/RC) pipeline:
      writing an incoming flit to an input buffer(s) of a start EXTRA router, and
      computing a route for the incoming head flit by selecting an output port to depart from the start EXTRA router;
   (B) in a switch allocation-local (SA-L) pipeline:
      arbitrating the start EXTRA router to choose an input port and an output port for a winning flit;
   (C) in a setup request (SR) pipeline:
      handling transmission of a plurality of SR signals from the start EXTRA router to downstream EXTRA routers via SR wires;
   (D) in a switch allocation-global (SA-G) pipeline:
      receiving the SR signals from the start EXTRA router via the SR wires, and
      arbitrating, based on the SR signals received from the start EXTRA router, three signals including: a buffer write enable ($BW_{ena}$) signal for a local buffered flit, a bypass mux ($BM_{sel}$) signal for a first crossbar switch, and a crossbar select ($XB_{sel}$) signal for a second crossbar switch of a selected output port, to build an express path for the winning flit to traverse multiple hops to a destination EXTRA router within one cycle of the start EXTRA router; and
   (E) in a switch traversal and link traversal (ST/LT) pipeline:
      traversing the winning flit to the selected output port of the start EXTRA router,
      transmiting the winning flit to a destination EXTRA router, and
      bypassing, via the express path, at least one EXTRA router between the start EXTRA router and destination EXTRA router.

7. The method according to claim 6 wherein the plurality of SR signals are generated by the SA-L pipeline.

8. The method according to claim 6 wherein the plurality of SR signals are generated by the SR pipeline.

9. The method according to claim 6 wherein a time period of the pipelines are regulated by a plurality of registers inserted between any two adjacent pipelines of the BW/RC, SA-L, SR, SA-G, and ST/LT pipelines.

10. The method according to claim 9, wherein the plurality of registers are clocked synchronously.

* * * * *